United States Patent [19]
Roberts et al.

[11] Patent Number: 5,725,919
[45] Date of Patent: Mar. 10, 1998

[54] LEAD-FREE GLASS ENAMELS FOR DECORATING GLASS BEVERAGE CONTAINERS AND METHODS FOR USING THE SAME

[75] Inventors: Gordon J. Roberts, Parma; John J. Maloney, Solon; Sivasubraman K. Muralidhar, North Royalton, all of Ohio

[73] Assignee: Ferro Corporation, Cleveland, Ohio

[21] Appl. No.: 403,259

[22] Filed: Mar. 13, 1995

Related U.S. Application Data

[63] Continuation-in-part of Ser. No. 213,497, Mar. 16, 1994, abandoned.

[51] Int. Cl.$^6$ ................................................ C03C 3/066
[52] U.S. Cl. .................... 428/34.5; 428/34.6; 501/18; 501/21; 501/26; 427/376.2; 427/419.4
[58] Field of Search ............................ 428/34.1, 34.5, 428/34.6; 501/18, 21, 26; 427/376.2, 419.4

[56] References Cited

U.S. PATENT DOCUMENTS

| | | | |
|---|---|---|---|
| 2,409,412 | 10/1946 | Amistead | 106/54 |
| 3,726,698 | 4/1973 | Hares et al. | 106/54 |
| 3,743,417 | 7/1973 | Smatlak | 355/125 |
| 4,043,824 | 8/1977 | Wagar | 106/48 |
| 4,196,004 | 4/1980 | Berretz | 106/48 |
| 4,282,035 | 8/1981 | Nigrin | 106/48 |
| 4,340,645 | 7/1982 | O'Connor | 428/428 |
| 4,446,241 | 5/1984 | Francel et al. | 501/14 |
| 4,537,862 | 8/1985 | Francel et al. | 501/14 |
| 4,752,460 | 6/1988 | Herren | 423/593 |
| 4,814,298 | 3/1989 | Nelson et al. | 501/17 |
| 4,822,396 | 4/1989 | Reinherz et al. | 65/60.7 |
| 4,828,596 | 5/1989 | Reinhetz | 65/24 |
| 4,839,313 | 6/1989 | Kondo et al. | 501/14 |
| 4,859,637 | 8/1989 | Roberts | 501/79 |
| 4,892,847 | 1/1990 | Reinherz | 501/14 |
| 4,902,734 | 2/1990 | Dexter et al. | 524/91 |
| 4,937,063 | 6/1990 | Sullivan | 423/593 |
| 4,959,090 | 9/1990 | Reinherz | 65/60.4 |
| 4,970,178 | 11/1990 | Klimas et al. | 501/26 |
| 4,983,196 | 1/1991 | Stotka | 65/24 |
| 4,997,687 | 3/1991 | Carter | 428/34 |
| 5,030,503 | 7/1991 | Carter et al. | 428/195 |
| 5,200,369 | 4/1993 | Clifford et al. | 501/66 |
| 5,306,674 | 4/1994 | Ruderer et al. | 501/70 |

FOREIGN PATENT DOCUMENTS

| | | |
|---|---|---|
| 156327 | 5/1954 | Australia. |
| 238302 | 4/1962 | Australia. |
| 248836 | 1/1964 | Australia. |
| 7220/66 | 6/1966 | Australia. |
| 17495/88 | 6/1988 | Australia. |
| 0321297 | of 0000 | European Pat. Off.. |
| 0444821A1 | of 0000 | European Pat. Off.. |
| 0509792A2 | of 0000 | European Pat. Off.. |
| 0527402A1 | of 0000 | European Pat. Off.. |
| 0579406A1 | of 0000 | European Pat. Off.. |
| 0267154A1 | 7/1985 | European Pat. Off.. |
| 2122481 | 7/1985 | France. |
| 2250740 | 12/1991 | United Kingdom. |
| 2072159A | 7/1994 | United Kingdom. |
| WO89/05781 | 8/1989 | WIPO. |
| WO90/15782 | 12/1990 | WIPO. |

OTHER PUBLICATIONS

Rao, "Unusual Properties and Structure of Glasses in the Systems Bi2O3–SrO; Bi2O3–B2O3–BaO; Bi2O3–B2O3–ZnO and Bi2O3–B2O3–PbO," 1965 International Congress on Glass.

*Primary Examiner*—Charles Nold
*Attorney, Agent, or Firm*—Rankin, Hill, Porter & Clark

[57] ABSTRACT

This invention relates to a lead-free glass enamel for glass beverage containers and a method of decorating glass beverage containers using such glass enamel. The method includes the steps of:

i) providing a glass beverage container;

ii) providing a decorative lead-free glass enamel comprising a glass frit, the glass frit comprising in weight percent from 17% to 28% $SiO_2$, from 12% to 30% $B_2O_3$, up to 3% $Al_2O_3$, up to 13% $Na_2O$, up to 13% $K_2O$, up to 14% $TiO_2$, from 5% to 30% ZnO, up to 14% $ZrO_2$, up to 6% CeO, up to 6% $Y_2O_3$, from 1% to 8% $La_2O_3$, up to 1% MgO, up to 5% CaO, up to 10% SrO, up to 16% BaO, from 0.5% to 5% fluoride, a maximum of 5% each of $WO_3$, $P_2O_5$, $Bi_2O_3$, $Sb_2O_3$ and $MoO_3$, with the provisions that the sum of the levels of plus $Na_2O$ plus $K_2O$ is in the range of 6% to 13%, that the sum of the levels of MgO plus CaO plus SrO plus BaO is in the range of 1% to 16%, and that the sum of the levels of $ZrO_2$ plus $TiO_2$ plus $La_2O_3$ plus $CeO_2$ plus $Y_2O_3$ is in the range of 7% to 25%;

iii) applying the glass enamel to at least a portion of the surface of the glass beverage container; and iv) firing the glass beverage container at a temperature of from about 560° C. to about 640° C. so as to produce a resilient decorative coating on the surface of the beverage container.

19 Claims, No Drawings

LEAD-FREE GLASS ENAMELS FOR DECORATING GLASS BEVERAGE CONTAINERS AND METHODS FOR USING THE SAME

RELATED APPLICATIONS

This application is a continuation-in-part of application Ser. No. 08/213,497, filed Mar. 16, 1994, now abandoned which is titled the same as the present application.

FIELD OF THE INVENTION

This invention relates to lead-free glass enamels. More particularly, this invention concerns lead-free glass enamels for decorating or coating glass beverage containers.

BACKGROUND OF THE INVENTION

Lead containing enamels for glass substrates are well-known in the ceramic art. Such enamels are often applied to glass surfaces in the form of a paste, the paste containing finely ground particles of a glassy material, commonly called "frit", and a vehicle. After application of the enamel to the glass surface by silk screening or other application techniques, the glass is fired to volatilize and/or thermally decompose and drive off the vehicle, fuse the frit, and bond the enamel to the glass surface.

Glass enamels are frequently utilized by the food and beverage industry to decorate glass containers. Glass beverage containers place particularly demanding requirements on a glass enamel. Specifically, the glass enamel must be soft enough to fuse to the container without the glass container softening to the point of distortion. The glass enamel must also have suitable thermal expansion properties to control the stress at the substrate/enamel interface to minimize the fracture potential. Further, the glass enamel must have good chemical durability to withstand the cleaning agents, and the foods or beverages to which it will be exposed during the use of the decorated beverage container.

In the past, glass enamels have been based on frits containing high levels of lead oxide (i.e., 40–80%). The high lead oxide content enables the glass enamels to have low maturation temperatures and very good chemical resistance. Recently, much work has been done on replacing the lead oxide content of the frit or developing a completely new frit which has similar or acceptable physical and chemical properties.

Art example of a prior art lead-free glass enamel may be found in Roberts, U.S. Pat. No. 4,859,637. Roberts discloses a lead-free glass enamel including a frit comprising by weight 19–45% $SiO_2$, 20–33% $B_2O_3$, 8–15% alkali metal oxide, 0–35% ZnO, 0–10% $ZrO_2$, 0–6% $Al_2O_3$, 0–3% BaO, 0–8% $P_2O_5$, 0–6% $La_2O_3$, 2–10% $F_2$, and 2–25% of a UV additive.

Another example of a lead-free glass enamel may be found in Roberts, International Publication No. WO 90/15782. This reference discloses a lead-free glass enamel comprising by weight 30–51% $SiO_2$, 19–50% $B_2O_3$, 2–20% $ZrO_2$, up to 14% $Na_2O$, up to 6% $K_2O$, up to 19% ZnO, up to 5% $Li_2O$, and 2–8 parts $F_2$ per 100 parts of the other components in the composition.

Another example of a prior art lead-free glass enamel may be found in Francel et. al., U.S. Pat. No. 4,537,862. Francel et. al. discloses a glass enamel including a frit comprising by weight 25–32% $SiO_2$, 25–32% $B_2O_3$, 10–18% $ZrO_2$, 0–9% $Na_2O$, 0–5% $K_2O$, 0–9% $Li_2O$, 0–2% $SnO_2$, 0–3% $F_2$, 0–3% CaO, 0–6% SrO, and 10–18% rare earth oxide wherein the ratio of $ZrO_2$ to rare earth oxide is about 1.0:1 to 1.4:1, the amount of $ZrO_2$ plus rare earth oxide is about 20–33%, and the sum of the alkali metal oxide additions is about 1–10%.

Unfortunately, none of the above prior art references disclose or suggest a lead-free glass enamel that exhibits the alkali and acid resistance, maturation temperature, and thermal expansion properties required for beverage container applications.

SUMMARY OF THE INVENTION

The present invention provides a new and improved lead-free glass enamel that exhibits good thermal expansion properties, good acid and alkali resistance, and is compatible with firing temperatures commonly used by the beverage container industry. The glass enamel is also capable of being manufactured at a reasonable cost.

In one preferred embodiment the invention provides a method for producing a decorated beverage container. The method includes the steps of:

i) providing an undecorated glass beverage container;

ii) providing a decorative lead-free glass enamel comprising a vehicle, a pigment, and a lead-free glass frit, the glass frit comprising in weight percent from 17–28% $SiO_2$, from 12–30% $B_2O_3$, up to 13% $Na_2O$, up to 13% $K_2O$, up to 1% MgO, up to 5% CaO, up to 10% SrO, up to 16% BaO, from 5–30% ZnO, up to 14% $TiO_2$, up to 14% $ZrO_2$, from 1–8% $La_2O_3$, up to 6% each of $CeO_2$ and $Y_2O_3$, up to 3% $Al_2O_3$, from 0.5–5% fluoride, up to 5% each of $Bi_2O_3$, $MoO_3$, $WO_3$, $P_2O_5$, and $Sb_2O_3$, with the provisions that the sum of the levels of the $Na_2O$ plus $K_2O$ is from 6–13%, that the sum of the levels of the MgO plus CaO plus SrO plus BaO is from 1–16%, that the sum of the levels of $TiO_2$ plus $ZrO_2$ is from 5–22%, that the sum of the levels of $TiO_2$ plus $ZrO_2$ plus $La_2O_3$ plus $CeO_2$ plus $Y_2O_3$ is from 7–25%;

iii) applying the glass enamel to at least a portion of the surface of the glass beverage container; and iv) firing the glass beverage container at a temperature of from about 560° C. to about 640° C. so as to produce a resilient fired decorative coating on the surface of the glass beverage container, the fired decorative coating displaying an alkali weight loss of less than 100 mg using a modified ASTM test procedure C675-85.

In another aspect of the invention there is provided a decorated beverage container which has been decorated using the lead-free glass enamel described above.

The foregoing and other features of the invention are hereinafter more fully described and particularly pointed out in the claims. The following description sets forth in detail certain illustrative embodiments of the invention, these being indicative, however, of but a few of the various ways in which the principles of the present invention may be employed.

DETAILED DESCRIPTION

This invention relates to lead-free glass enamels specifically suited for use on glass beverage containers. As used in the specification and claims below, the term "glass beverage container" means a glass container for storing food, beverages or other edible materials. Such glass beverage containers typically comprise by weight about 65% to 75% $SiO_2$, about 7% to about 15% $Na_2O$ and about 5% to about 15% (CaO+MgO), and more particularly by weight about 72% $SiO_2$, about 13% $Na_2O$, about 10–12% (CaO+MgO), about 2% $Al_2O_3$, and about 1% $K_2O$. Such containers are generally subject to rough handling and chemically harsh environments, especially during cleaning operations.

The lead-free glass enamels of the present invention possess not only coefficients of thermal expansion that are compatible with glass beverage containers, but they also possess maturation temperatures which are similar to those of widely used conventional lead-containing enamels and which are sufficiently low to permit their use under firing conditions commonly used by the glass beverage container industries. The chemical durability, especially the alkali resistance, of the glass enamels is also significantly improved relative to previous lead-free glass enamels possessing the above characteristics. Additionally, the cost of the raw materials utilized in the production of glass enamels made in accordance with the present invention is significantly less than that of lead-free glass enamels which achieve a low maturation temperature with high levels of $Bi_2O_3$.

The glass enamels made in accordance with the present invention contain less than about 0.5% by weight lead oxide (PbO). Even further preferred, the glass enamels contain less than about 0.05% by weight PbO. As used in this specification and the claims below the term "lead-free" means no intentional addition of lead or lead oxide to the glass enamel and less than 0.5% by weight PbO.

The moderate maturation temperatures of the glass enamels of this invention minimize thermal damage or distortion to the underlying glass beverage container during firing. Also, the coefficients of thermal expansion of these systems, ranging from about $70 \times 10^{-7}$ cm/cm/°C. to about $90 \times 10^{-7}$ cm/cm/°C., are such that excessive tension is not developed near the glass enamel/substrate interface. This property is crucial for pressurized beverage containers.

The glass enamel of the present invention preferably matures and is compatible with a commercial fire at from about 560° C. to about 640° C., and preferably from about 580° C. to about 620° C. in a typical, approximately 90 min. firing cycle. Unless otherwise indicated, temperatures referred to herein are firing temperatures, that is to say oven temperature.

Generally, the glass enamel of the present invention comprises a pigment, a glass frit, and a vehicle. The pigment or colorant material may comprise any one or more of a number of commercially available inorganic or organic colors or pigments. Such materials are described, for example, in *Kirk-Othmer Encyclopedia of Chemical Technology*, Third Edition, Vol. 6, pp 597–617, which is incorporated herein by reference. Examples of inorganic pigments include, for example, $TiO_2$, cadmium sulfide/selenide pigments, and cobalt aluminate. The glass enamel of the present invention generally comprises by weight from about 0.5% to about 40% pigment, and more particularly from about 1% to about 35% pigment.

The glass frit of the present invention can be melted in sintered fused silica crucibles at about 1200° C. to about 1250° C. with little attack on the crucible, though melting time must be controlled somewhat closely because of fluorine loss and will vary according to the size of the batch. A preferred time for a 500 gram batch may be about 25–30 minutes, while a preferred time for a 1 kg batch of the same composition may be about 55–65 minutes. The melt may be handled by any suitable means though typically it is quenched by steel rolls into flake, using conventional techniques well-known to those skilled in the art.

The lead-free glass frits of the present invention comprise the following compositions:

| Component | Range (Wt. %) | Preferred Range (Wt. %) |
|---|---|---|
| $SiO_2$ | 17–28 | 20–27 |
| $B_2O_3$ | 12–30 | 13–29 |
| $Na_2O$ | 0–13 | 4–12 |
| $K_2O$ | 0–13 | 0–11 |
| MgO | 0–1 | 0—0.5 |
| CaO | 0–5 | 0–3 |
| SrO | 0–10 | 0–5 |
| BaO | 0–16 | 0–10 |
| ZnO | 5–30 | 10–30 |
| $TiO_2$ | 0–14 | 2–10 |
| $ZrO_2$ | 0–14 | 2–10 |
| $La_2O_3$ | 1–8 | 2–5 |
| $CeO_2$ | 0–6 | 0–4 |
| $Y_2O_3$ | 0–6 | 0–4 |
| $Al_2O_3$ | 0–3 | 0–2 |
| Fluoride* | .5–5 | .75–4 |
| $Bi_2O_3$ | 0–5 | 0–3 |
| $MoO_3$ | 0–5 | 0–2 |
| $WO_3$ | 0–5 | 0–2 |
| $P_2O_5$ | 0–5 | 0–2 |
| $Sb_2O_3$ | 0–5 | 0–2 |

*Retained Fluoride - Unless otherwise indicated all fluoride levels specified herein this pecification and the claims below are final or retained levels of fluoride.

The chemical durability is greatly enhanced by the simultaneous application of three formulation conditions. First, significant levels of additions of $ZrO_2$ plus $TiO_2$ are needed, with a combined weight of addition of from about 5% to about 21%, and preferably from about 7% to about 20%. Second, additions of $CeO_2$ and $Y_2O_3$, and $La_2O_3$ result in enhanced chemical durability in addition to that given by $ZrO_2$ and $TiO_2$. A combined weight of $ZrO_2$ plus $TiO_2$ plus $La_2O_3$ plus $CeO_2$ plus $Y_2O_3$ of from about 7% to about 25%, and preferably from about 8% to about 23% gives greatly enhanced chemical resistance while not unduly increasing the enamel's maturation temperature. While a mix of these components gives the best results, acceptable chemical resistance can generally still be achieved without one or more of the components by compensating with higher levels of the ones that are used. Incorporation of alkaline earth oxides is a third critical factor for achieving acceptable chemical durability. The glass frit includes a combined weight of alkaline earth oxides (i.e., MgO+CaO+SrO+BaO) of from about 1 to about 16%, and preferably from about 4 to about 12% by weight. If the level of MgO is below about 0.2% by weight, then the combined weight of the CaO plus BaO plus SrO should be at least about 3% by weight. Higher levels of alkaline earth oxides can excessively increase the thermal expansion coefficient of the glass enamel.

The level of alkali metal oxides is important for achieving proper thermal expansion properties and obtaining good chemical resistance. The glass frit includes a combined weight of $Na_2O$ plus $K_2O$ of from about 6 to about 13%, and preferably from about 8 to about 12% by weight. While a mix of the two oxides gives slightly better properties, very acceptable glass enamels can generally be made with only one of $Na_2O$ and $K_2O$. For applications where a "softer" glass enamel is required, $Li_2O$ may be included up to about 2% by weight. However, an $Li_2O$ addition is not advisable for glass enamels used for pressurized beverage containers.

The glass enamels are made according to the following technique. Glass frits, in flake or granular form, are ball milled with water to an average particle size of about 3–8 microns as measured on a Microtrac particle size analyzer at the 50% level, dried, and blended with a conventional vehicle such as a vehicle sold under the trade designation C-42 (available from Ferro Corporation of Cleveland, Ohio) and a pigment. It will be appreciated that the present invention contemplates the use of various vehicles, the particular vehicle generally being a function of the particular application technique employed. Such vehicles include, for example, hot melt thermoplastic vehicles, cold paste vehicles, UV curable vehicles, water miscible vehicles, spray vehicles, and roll coat vehicles.

Fillers, other glass frits, and other additives may be included in the glass enamel. Examples of such fillers include silica, zircon, zirconia and alumina. The glass enamel comprises by weight from about 30–90% glass frit as set forth above, from about 3–40% vehicle, and from about 0.05–40% pigment, other glass frits and fillers. Preferably, the glass enamel comprises by weight from about 35–85% glass frit as set forth above, from about 4–35% vehicle, and up to about 35% pigment, other glass frits and fillers. More preferably, the glass enamel comprises by weight from about 40–80% glass frit as set forth above, from about 5–35% vehicle, and up to about 30% pigment, other glass frits and fillers.

The resulting composition may be screen-printed or otherwise applied on the outer surface of the glass beverage container by methods known in the art (i.e., brushing, spraying, dipping, etc.) and then fired to produce an enamel finish on the surface of the glass beverage container.

A post-fired enamel finish produced in accordance with the principles of the present invention exhibits good alkali resistance which can meet the requirements for the beverage container industry. Specifically, utilizing a modified version of the ASTM test procedure C675-85, the glass enamels display a weight loss of less than 100 mg, and preferably less than 60 mg, when immersed in the hot alkali solution for two hours. More particularly, the modified procedure comprises the following steps: 1) coating a 2"×4" flat glass coupon with the glass enamel to provide a decorated area that is 1.5"×2.5" containing 110–120 mg of enamel (after firing); 2) firing the decorated coupon through a programmed furnace with about a 90 minute cycle with a maximum temperature of from about 580° C. to about 620° C.; 3) immersing for two hours the decorated coupon and a blank (uncoated) coupon in an alkali solution comprising by weight 9.1% NaOH, 0.9% $Na_3PO_4 \cdot 12H_2O$, and 90% tap water heated to 88° C. in a water bath. The decorated and blank coupons are weighed before and after immersion. The weight loss of the decorated coupon, less 80% of the weight loss of the blank coupon (in order to compensate for the undecorated portion of the glass coupon), yields the net weight loss of the glass enamel. Generally, a weight loss of 25 mg is experienced for the blank coupon, thereby resulting in the subtraction of 20 mg from the weight loss of the decorated coupon. As used in this specification and the claims below, the term "modified ASTM test procedure C675-85" means the alkali resistance test described immediately above.

The acid resistance of the glass enamels was measured using ASTM test procedure C724-88 which uses a 10% citric acid solution for 15 minutes at room temperature. Previous lead-free glass frits which matured at temperatures below 640° C. typically gave a grade 7 attack (i.e., complete removal of the glass enamel in the exposed area). The lead-free glass frits of the present invention typically give grade 3 (i.e., a definite stain which does not blur reflected images and is visible at angles less than 30°) to grade 6 (i.e., significant removal of enamel with pin holing) attack, with the harder frits maturing at temperatures near 600° C. generally showing less attack.

By way of illustration and not by any limitation, the following examples will describe specific glass enamel compositions and methods of using such enamel compositions, which methods and compositions are within the scope of the present invention. As with the text above and the claims below, unless otherwise indicated, all parts and percentages are by weight, and all temperatures are in degrees Centigrade.

EXAMPLE I

Below in Table I are various glass frit compositions A–J made in accordance with the present invention. The frit compositions are final compositions with the exception of the fluoride as indicated.

Glass enamel sample compositions A through J shown in Table II below are prepared by first ball milling the glass frits of Table I in a water solution to a particle size of about 3 to 8 microns, as determined by a Microtrac Particle Size Analyzer at a 50% level.

TABLE I

| Component | Approximate % By Weight | | | | | | | | | |
|---|---|---|---|---|---|---|---|---|---|---|
| | A | B | C | D | E | F | G | H | I | J |
| $SiO_2$ | 23 | 27 | 24 | 27 | 28 | 23 | 25 | 22 | 19 | 23 |
| $B_2O_3$ | 16 | 20 | 26 | 20 | 21 | 24 | 17 | 24 | 12 | 14 |
| $Na_2O$ | 6 | 6 | 9 | 6 | 6 | 6 | 7 | 6.5 | 6.5 | 6.5 |
| $K_2O$ | 5 | 4 | 2 | 4 | 5 | 5 | 5 | 4 | 4 | 4 |
| MgO | 0.4 | — | — | — | 1 | — | — | — | — | — |
| CaO | 2 | 3 | 2 | 3 | 3 | 1 | 2 | — | 1 | — |
| SrO | 2 | 2 | 5 | 2 | — | — | 2 | 2 | 2 | 2 |
| BaO | 4 | 4 | 5 | 4 | 10 | — | 5 | 4 | 4 | 4 |
| ZnO | 26 | 13 | 10 | 13 | 6 | 18 | 28 | 15 | 30 | 22 |
| $TiO_2$ | 3 | 5 | 4 | 5 | 6 | 11 | 3 | 8 | 10 | 14 |
| $ZrO_2$ | 5 | 10 | 6 | 7 | 8 | 7 | 2 | 10 | 7 | 6 |
| $La_2O_3$ | 2 | 1.5 | 4 | 4 | 5 | 4 | 3 | 4 | 4 | 4 |
| $Nd_2O_3 + Pr_6O_{11}$ | — | 0.5 | — | — | — | — | — | — | — | — |
| $CeO_2$ | — | 2 | — | — | — | — | — | — | — | — |
| $Al_2O_3$ | 1 | 2 | 2 | 2 | 2 | 1 | 1 | 0.5 | 0.5 | 0.5 |
| Fluoride* | 3 | 3.5 | 2 | 3.5 | 4 | 1 | 3 | 3 | 3 | 3 |
| $Bi_2O_3$ | 3 | — | — | — | — | — | — | — | — | — |
| $P_2O_5$ | 1 | — | — | — | — | — | — | — | — | — |
| $Sb_2O_3$ | — | — | — | 3.5 | — | — | — | — | — | — |
| Alk. Res.[1] | 86 | 15 | 36 | 18 | 9 | 98 | 90 | 54 | 47 | 34 |

TABLE I-continued

| | Approximate % By Weight | | | | | | | | | |
|---|---|---|---|---|---|---|---|---|---|---|
| Component | A | B | C | D | E | F | G | H | I | J |
| $T_f (C)^2$ | 563 | 603 | 599 | 606 | 606 | 597 | 560 | 583 | 567 | 579 |
| Exp.$^3$ | 90 | 87 | 85 | 84 | 87 | 74 | 92 | 82 | — | 84 |

*Added as an addition to a 100% basis of the oxide mix.
$^{1)}$Using modified ASTM test procedure C675-85, two hour net weight loss given in mg.
$^{2)}$Fusion temperature measured from an enameled coupon fired for 10 minutes in a hot gradient furnace.
$^{3)}$Thermal expansion (units of $10^{-7}$ cm/cm/°C, measured by dilatometry, values for a 25–300° C. temperature range.

After milling, the particles of glass frit are dried. The dried particles are blended with a pigment and a vehicle in order to provide an enamel having the following composition as shown in Table II.

TABLE II

| Component | A | B | C | D | E | F | G | H | I | J |
|---|---|---|---|---|---|---|---|---|---|---|
| Glass Frit | 6 g | 6 g | 6 g | 6 g | 6 g | 6 g | 6 g | 6 g | 6 g | 6 g |
| C-42 Vehicle (Ferro Corporation) | 2.5 g | 2.5 g | 2.5 g | 2.5 g | 2.5 g | 2.5 g | 2.5 g | 2.5 g | 2.5 g | 2.5 g |
| Pigment 266X (Ferro Corporation) | 0.5 g | 0.5 g | 0.5 g | 0.5 g | 0.5 g | 0.5 g | 0.5 g | 0.5 g | 0.5 g | 0.5 g |

EXAMPLE 2

The glass enamel compositions A–J of Example 1 are applied to 2"×4" glass substrates to provide a 1.5"×2.5" decorated area using conventional screen printing techniques so as to leave about a 110–120 mg deposit of glass enamel subsequent to firing. The coated glass coupons are then fired at 620° C. using a typical 90 minute firing cycle. The fired coupons are then tested for alkali resistance using the modified ASTM test procedure C675-85. The glass enamels are also applied to 1"×8" glass substrates and fired in a preheated gradient furnace for 10 minutes. This enables determination of a relative value of the glass enamel's fusion temperature. The results given in the table in Example 1 show that the glass enamels of the present invention provide relatively soft enamels which mature at less than 620° C. with a typical conventional fire, have thermal expansion coefficients within the desired range of 70–90×$10^{-7}$ cm/cm/°C., and exhibit fair to very good alkali resistance which will meet the requirements of the beverage container industry. The fusion temperatures, as measured, are generally within about 20° C. of the maturation temperature.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed:

1. A method of decorating a glass beverage container comprising the steps of:

i) providing a glass beverage container;

ii) providing a decorative lead-free glass enamel comprising a glass frit, said glass frit consisting of in weight percent from 17% to 28% $SiO_2$, from 12% to 30% $B_2O_3$, up to 3% $Al_2O_3$, up to 13% $Na_2O$, up to 13% $K_2O$, up to 14% $TiO_2$, from 5% to 30% ZnO, up to 14% $ZrO_2$, up to 6% $CeO_2$, up to 6% $Y_2O_3$, from 1% to 8% $La_2O_3$, up to 1% MgO, up to 5% CaO, up to 10% SrO, up to 16% BaO, from 0.5% to 5% fluoride, a maximum of 5% each of $P_2O_5$, $Sb_2O_3$, $WO_3$, $Bi_2O_3$ and $MoO_3$, with the provisions that the combined weight of $Na_2O$ plus $K_2O$ is in the range of 6% to 13%, that the combined weight of MgO plus CaO plus SrO plus BaO is in the range of 1% to 16%, that the combined weight of $ZrO_2$ plus $TiO_2$ is in the range of 5% to 22%, and that the combined weight of $ZrO_2$ plus $TiO_2$ plus $La_2O_3$ plus $CeO_2$ plus $Y_2O_3$ is in the range of 7% to 25%;

iii) applying said glass enamel to at least a portion of the surface of said glass beverage container; and iv) firing said glass beverage container at a temperature of from about 560° C. to about 640° C. so as to produce a resilient decorative coating on the surface of said beverage container.

2. A method as set forth in claim 1 wherein the glass enamel prior to firing comprises by weight 30–90% said glass frit, from 3% to 40% of a vehicle and up to 40% of a pigment and a filler, and said fired resilient decorative coating displays a weight loss of less than 100 mg using a modified ASTM test procedure C675-85.

3. A method as set forth in claim 2 wherein the glass enamel prior to firing comprises by weight from 35% to 85% said glass frit, from 4% to 35% said vehicle and up to 35% said pigment and said filler.

4. A method as set forth in claim 3 wherein said filler comprises a material selected from the group consisting of alumina, zircon, zirconia, silica and mixtures thereof.

5. A method as set forth in claim 1 wherein said glass frit comprises from 10% to 30% ZnO, and if the level of MgO in said glass frit is less than about 0.2% by weight then the combined weight of CaO plus SrO plus BaO is at least about 3% by weight.

6. A method as set forth in claim 1 wherein said glass frit comprises from 13% to 29% $B_2O_3$.

7. A method as set forth in claim 1 wherein said glass frit comprises from 20% to 27% $SiO_2$.

8. A method as set forth in claim 1 wherein said glass frit comprises from 0% to 11% $K_2O$ and from 4% to 12% $Na_2O$.

9. A method as set forth in claim 1 wherein said glass frit comprises from 2% to 10% $ZrO_2$.

10. A method as set forth in claim 1 wherein said glass frit comprises from 0% to 4% $CeO_2$.

11. A method as set forth in claim 1 wherein said glass frit comprises from 0.75% to 4% fluoride.

12. A method as set forth in claim 1 wherein said glass frit comprises from 2% to 5% $La_2O_3$.

13. A method as set forth in claim 1 wherein said glass frit comprises from 0% to 5% SrO.

14. A method as set forth in claim 1 wherein said glass frit comprises a combined weight of from 4% to 12% MgO plus CaO plus SrO plus BaO.

15. A method as set forth in claim 1 wherein said glass frit comprises up to 3% $Bi_2O_3$.

16. A method as set forth in claim 1 wherein said glass frit comprises a combined weight of from 8% to 23% $TiO_2$ plus $ZrO_2$ plus $La_2O_3$ plus $CeO_2$ plus $Y_2O_3$.

17. A method as set forth in claim 1 wherein said glass frit comprises from up to 2% each of $WO_3$, $P_2O_5$, $Sb_2O_3$ and $MoO_3$.

18. A method as set forth in claim 1 wherein said glass frit comprises a combined weight of from 7% to 20% $ZrO_2$ plus $TiO_2$.

19. A decorated beverage container comprising a glass container having a fired decorative coating formed along at least a portion of the outside surface thereof, said fired decorative coating formed by firing a lead-free glass enamel at a temperature of from about 560° C. to about 640° C. comprising a glass frit consisting of in weight percent from 17% to 28% $SiO_2$, from 12% to 30% $B_2O_3$, up to 3% $Al_2O_3$, up to 13% $Na_2O$, up to 13% $K_2O$, up to 14% $TiO_2$, from 5% to 30% ZnO, up to 14% $ZrO_2$, up to 6% $CeO_2$, up to 6% $Y_2O_3$, from 1% to 8% $La_3O_3$, up to 1% MgO, up to 5% CaO, up to 10% SrO, up to 16% BaO, from 0.5% to 5% fluoride, a maximum of 5% each of $P_2O_5$, $Sb_2O_3$, $WO_3$, $Bi_2O_3$ and $MoO_3$, with the provisions that the combined weight of $Na_2O$ plus $K_2O$ is in the range of 6% to 13%, that the combined weight of MgO plus CaO plus SrO plus BaO is in the range of 1% to 16% and if the level of MgO is less than about 0.2% then the combined weight of CaO plus SrO plus BaO is at least 4%, that the combined weight of $ZrO_2$ plus $TiO_2$ is in the range of 5% to 22%, and that the combined weight of $ZrO_2$ plus $TiO_2$ plus $La_2O_3$ plus $CeO_2$ plus $Y_2O_3$ is in the range of 7% to 25%, said fired decorative coating displaying a weight loss of less than 100 mg using a modified ASTM test procedure C675-85.

* * * * *